United States Patent [19]

Narukawa et al.

[11] Patent Number: 5,425,847
[45] Date of Patent: * Jun. 20, 1995

[54] REMOVAL METHOD OF GLASS ADHERED TO SINTERED OBJECT

[75] Inventors: Akira Narukawa, Yokkaichi; Mitsuyoshi Watanabe, Nagoya, both of Japan

[73] Assignee: NGK Insulators, Ltd., Japan

[*] Notice: The portion of the term of this patent subsequent to Nov. 9, 2010 has been disclaimed.

[21] Appl. No.: 116,199

[22] Filed: Sep. 3, 1993

[30] Foreign Application Priority Data

Sep. 8, 1992 [JP] Japan .................... 4-239501

[51] Int. Cl.$^6$ .................... B22F 3/00; B28B 3/00
[52] U.S. Cl. .................... 216/91; 252/79.5; 216/97; 216/99
[58] Field of Search ............ 156/637, 655, 657, 663; 252/79.5; 134/34

[56] References Cited

U.S. PATENT DOCUMENTS

| | | | |
|---|---|---|---|
| 3,383,255 | 5/1968 | Rossi et al. | 156/637 |
| 4,446,100 | 5/1984 | Adlerborn et al. | 419/48 |
| 4,568,516 | 2/1986 | Adlerborn et al. | 419/26 |
| 4,842,840 | 6/1989 | Azuma et al. | 156/667 X |
| 4,853,204 | 8/1989 | Azuma et al. | 156/667 X |
| 5,259,921 | 11/1993 | Narukawa et al. | 156/630 |

FOREIGN PATENT DOCUMENTS

| | | | |
|---|---|---|---|
| 0118702 | 9/1984 | European Pat. Off. | C04B 35/58 |
| 0320927 | 6/1989 | European Pat. Off. | B22F 3/14 |
| 0503854 | 9/1992 | European Pat. Off. | C04B 35/64 |
| 2444523 | 7/1980 | France | B22F 3/16 |
| 2048952 | 12/1980 | United Kingdom . | |
| 2200317 | 8/1988 | United Kingdom | B28B 3/00 |

OTHER PUBLICATIONS

Database WPI, Week 8327, Derwent Publications Ltd., London, GB; AN 83-702244 & JP-A-58 088 177 (Kobe Steel KK) May 26, 1983.
O. V. Mazurin et al "Handbook of Glass Data, Part C" 1987, Elsevier, Amsterdam NL; p. 488; table 2; p. 487, table 2.
H. Scholze "Glass" 1988, Springer-Verlag, Berline DE, tables 41–42.
C. T. Lynch "Practical Handbook of Materials Science" 1989, CRC Press, Boca Raton US, p. 283, right column, paragraph 2, paragraph 3.
World Patent Index Latest, Derwent Publications Ltd., London, GB. Week 8930 & JP-A-1153579 (Nagasaki Ken) Jun. 15, 1989 *Abstract*.

*Primary Examiner*—Thi Dang
*Attorney, Agent, or Firm*—Parkhurst, Wendel & Rossi

[57] ABSTRACT

Method of removing a layer of glass formed on a sintered body which is manufactured by hot isostatic pressing of a preformed body of inorganic powder in a pressure medium at a sintering temperature, wherein the sintered body of inorganic powder is retained in an alkali solution of at least 2 percent by weight at a temperature not less than 100° C. for not less than one hour.

6 Claims, 5 Drawing Sheets

REMOVAL METHOD OF GLASS ADHERED TO SINTERED OBJECT

BACKGROUND OF THE INVENTION

1. Field of the Invention

The present invention relates to a method of forming a sintered body of inorganic powder, and more particularly to a method of removing glass adhered to the sintered body during hot isostatic pressing process.

2. Discussion of the Prior Art

In the manufacturing of sintered objects, a preformed body of inorganic powder coated with glass is subjected to hot isostatic pressing during which the preformed powder body is isotropically pressed with a pressure medium such as inert gas under pressure at a high sintering temperature. The hot isostatic pressing is advantageous to manufacture sintered objects of complicated shapes having the same strength in all directions at a high sintering temperature. During the hot isostatic pressing process, however, the glass used as a sealing material is inevitably adhered to the sintered powder body.

To remove the adhered glass from the sintered powder body, there have been proposed a hammering method of applying a mechanical external force to the sintered powder body, a method of crystallizing the glass adhered to the sintered power body under control of its cooling temperature after sintering to facilitate removal of the glass, and a method of vaporizing the pressure medium melted in the layer of glass for foaming the glass and of cooling the foamed glass, as disclosed in Japanese Patent Publication No. 62-22953. In European Patent No. 0320927-A-1, there has been proposed a method of treating the adhered glass of the sintered powder body with water or vapor at a high temperature.

In the hammering method, it is required mechanically to apply a great external force to the sintered powder body for removal of the glass adhered thereto. This results in an increase of the manufacturing cost of this kind of sintered body. The second method, crystallization is effective only in use of special glass such as silica glass. It is, however, impossible to remove completely the adhered glass from the sintered power body. In the third method, foaming of the glass is greatly influenced by a condition of the hot isostatic pressing and the kind of the glass. It is, therefore, very difficult fully to foam the adhered glass of the sintered powder body. Even if the first hammering method was adapted prior to or after the third vaporizing method, it would be very difficult to remove completely the glass adhered to recessed portions of the sintered powder body.

In actual practices of the fourth method, the adhered glass may not be removed only by the water or vapor at a high temperature. It is, therefore, suggested in the specification of the European patent to use sodium hydroxide or other alkali compound for the fourth method. However, there is not disclosed any specific suggestion for use of the alkali compound, particularly in relation to a removal condition of the glass adhered to the sintered powder body.

SUMMARY OF THE INVENTION

It is, therefore, a primary object of the present invention to provide a method capable of easily removing the glass from the sintered powder body without any difficulties discussed above.

According to the present invention, the primary object is accomplished by providing a method of forming a sintered body, which comprises the steps of:

forming a preformed body of inorganic powder;

sintering the preformed body into a sintered body by hot isostatic pressing, the sintered body having an outer glass layer formed thereon during the hot isostatic pressing, the glass layer containing boric acid of 3 to 15 percent by weight; and exposing the outer glass layer to an alkali solution of at least 2 percent by weight at a temperature not less than 100° C. for not less than one hour, thereby removing the outer glass layer from the sintered body.

In actual practice of the present invention, it is preferable that the alkali solution includes at least one of potassium hydroxide and sodium hydroxide. It is also preferable that the sintered body is submerged in a closed decomposition container of alkali solution which is rotated or vibrated to cause flow of the alkali solution.

In the forming method of the sintered body, silicon nitride powder or silicon carbide powder is used as the inorganic powder, and the glass used as a sealing material is selected by taking into account reactions with the inorganic powder during the sintering process, thickness of the reaction layer formed on the surface of the sintered body, and strength of the reaction layer in connection with the sintered body. For this reason, it is desirable that the glass contains boric acid of 3 to 15 percent by weight.

BRIEF DESCRIPTION OF THE DRAWINGS

For a better understanding of the present invention, and to show how the same may be carried into effect, reference will now be made, by way of example, to the accompanying drawings, in which.

DESCRIPTION OF THE PREFERRED EMBODIMENT

Hereinafter, a preferred embodiment of the present invention will be described in detail. Prepared first in this embodiment were 1000 preformed powder bodies each in the form of a cubic body (of 5 mm in length, 10 mm in width and 5 mm in height) containing 98.7 percent by weight SiC, 0.8 percent by weight $B_4C$ and 0.5 percent by weight C. The preformed powder bodies were placed in a pot filled with borosilicate glass such as Pyrex glass containing 80.8 percent by weight $SiO_2$, 2.3 percent by weight $Al_2O_3$, 3.9 percent by weight $Na_2O$ and 12.5 percent by weight $B_2O_3$ the volume of which was approximately the same as the preformed powder bodies, and the pot was placed in a hot isostatic press device so that the preformed powder bodies are subjected to hot isostatic pressing at the sintering temperature of 2000° C. under 700 atmospheric pressure. The preformed powder bodies thus sintered were cracked into blocks of about 4 cm in diameter and of about 30 g, and the blocks were placed in a HU-100 type decomposition container (External shell: stainless, Internal shell: tetrafluoroethylene) made by Sanai Kagaku Kabushiki Kaisha.

Figure 6:
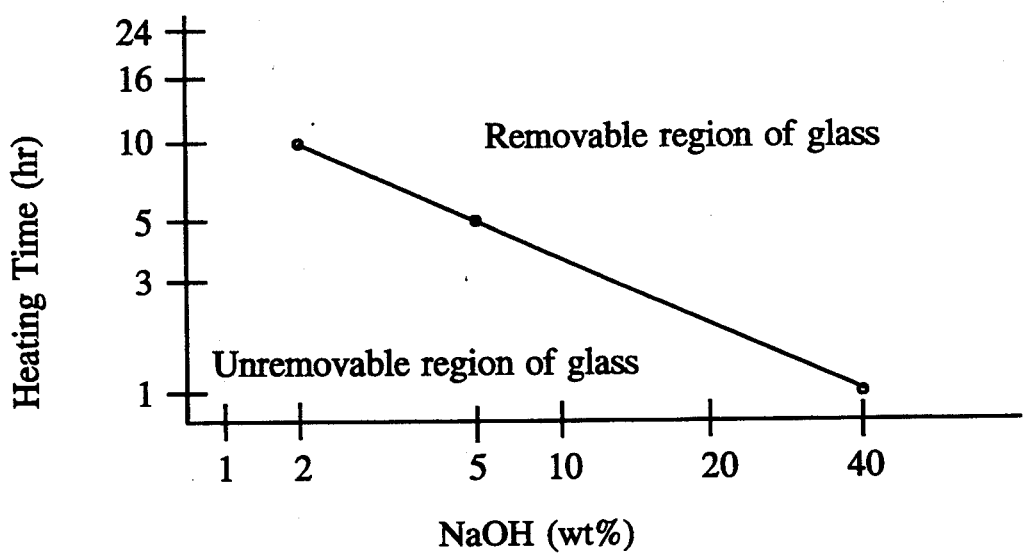
FIG. 6 is a graph showing a period of heating time in relation to the concentration of sodium hydroxide solution for removal of adhered glass from the sintered powder body retained at 250° C. in the sodium hydroxide solution.
Figure 7:
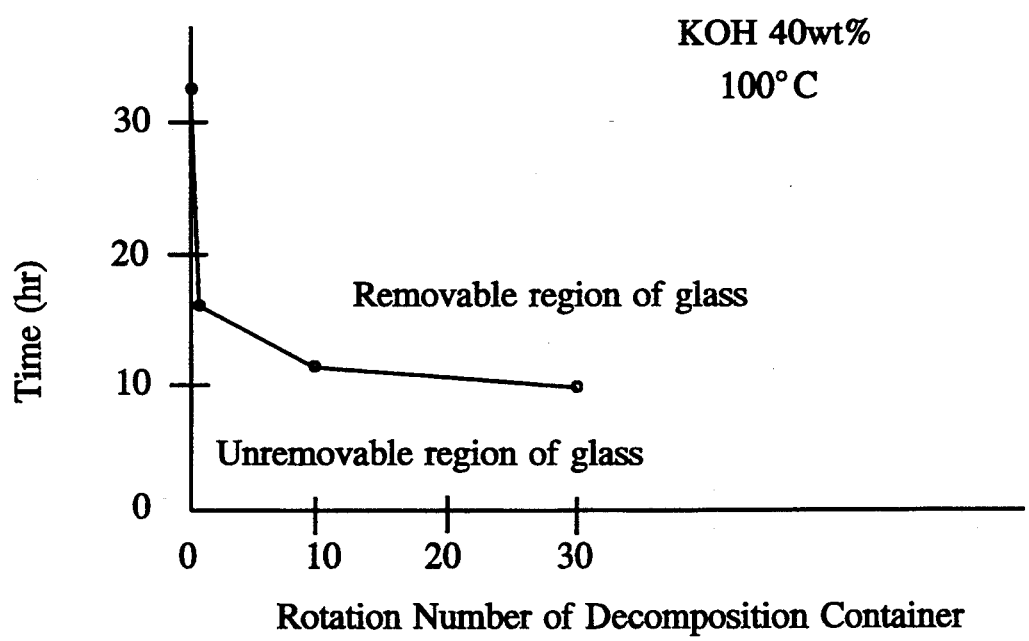
FIG. 7 is a graph showing a period of heating time in relation to the number of rotation of a decomposition container for removal of adhered glass from the sintered powder body retained at 100° C. in potassium hydroxide solution of 40 percent by weight.
Figure 8:
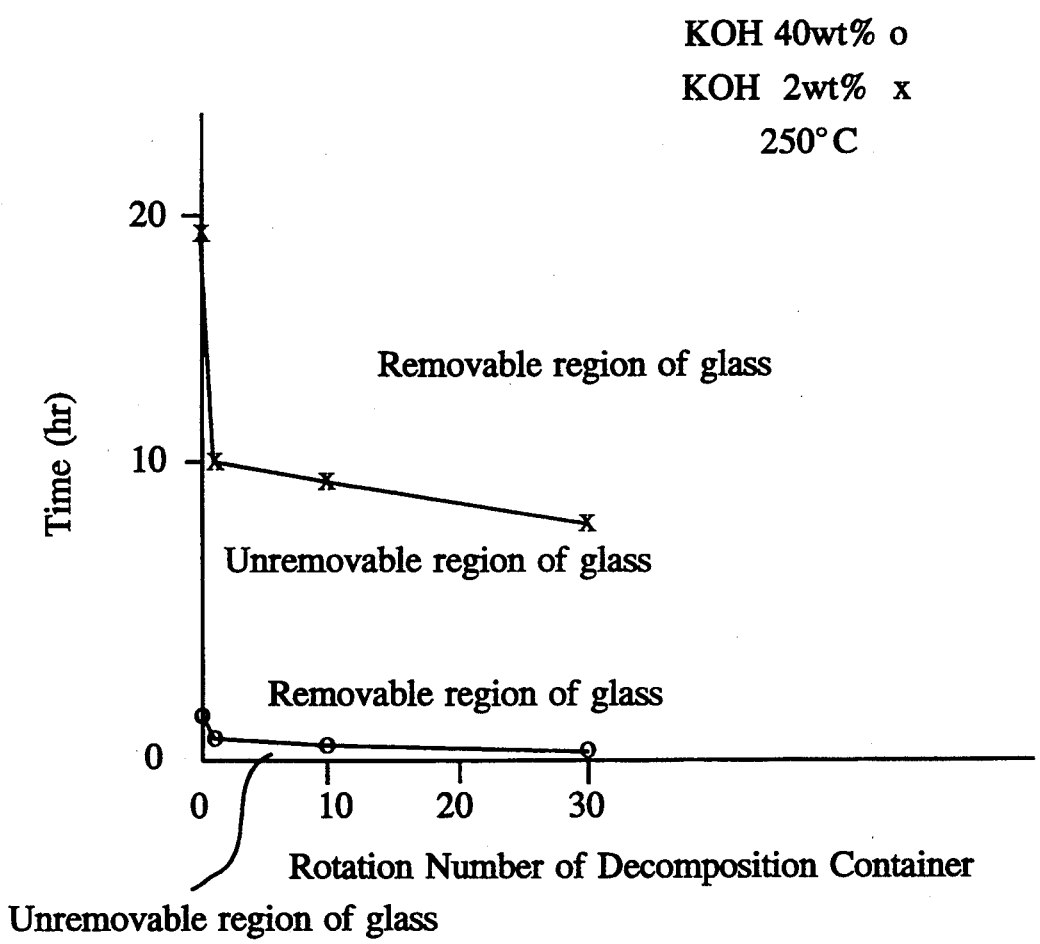
FIG. 8 is a graph showing a period of heating time in relation to the number of rotation of the decomposition container for removal of adhered glass from the sintered powder body retained at 250° C. in potassium hydroxide solution of 2 percent and 40 percent by weight.

To remove the glass from the sintered powder bodies, treatment solution of 30 ml was added into the decomposition container at various concentrations shown in Tables 1, 2 and 3 attached hereto, and the container was rotated once a minute to cause flow of the treatment solution. Thus, various tests were carried out in respective conditions shown in the Tables. The test results for removal of the glass are shown in Tables 1 to 3 and in FIGS. 1 to 6. In FIGS. 7 and 8 there are shown the test results in various flow conditions of the treatment solution in the container. In the Tables, double circle marks in the column of heating temperature and time each represent a condition where almost all the glass was removed from the sintered powder blocks, single circle marks each represent a condition where the sintered powder blocks were still covered with the glass which can be removed by the conventional hammering method, and "X" marks each represent a condition where the glass could not be removed from the sintered powder blocks.

Figure 1:
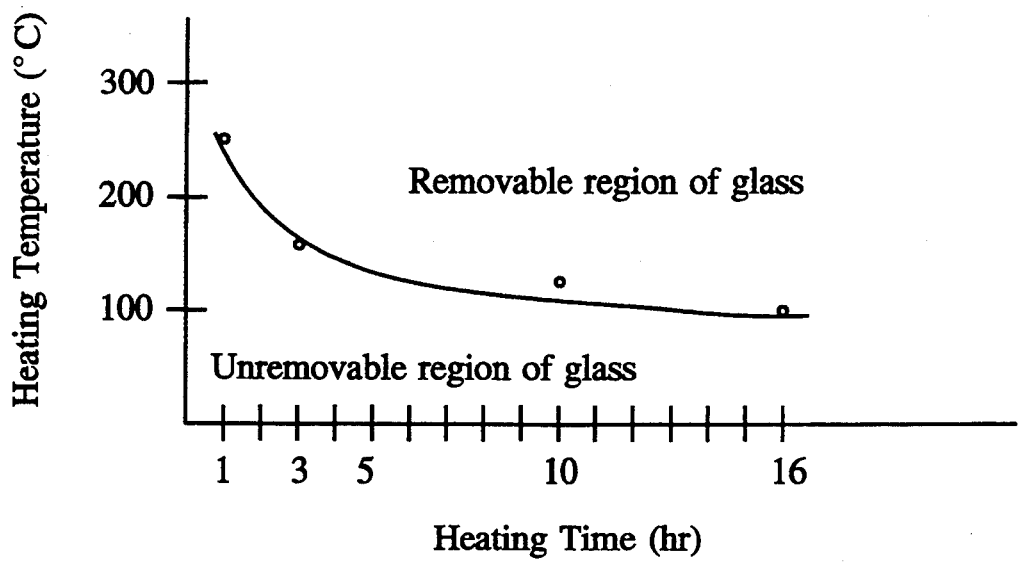
FIG. 1 is a graph showing a heating temperature in relation to a period of heating time for removal of adhered glass from a sintered powder body retained in potassium hydroxide solution of 40 percent by weight.
Figure 2:
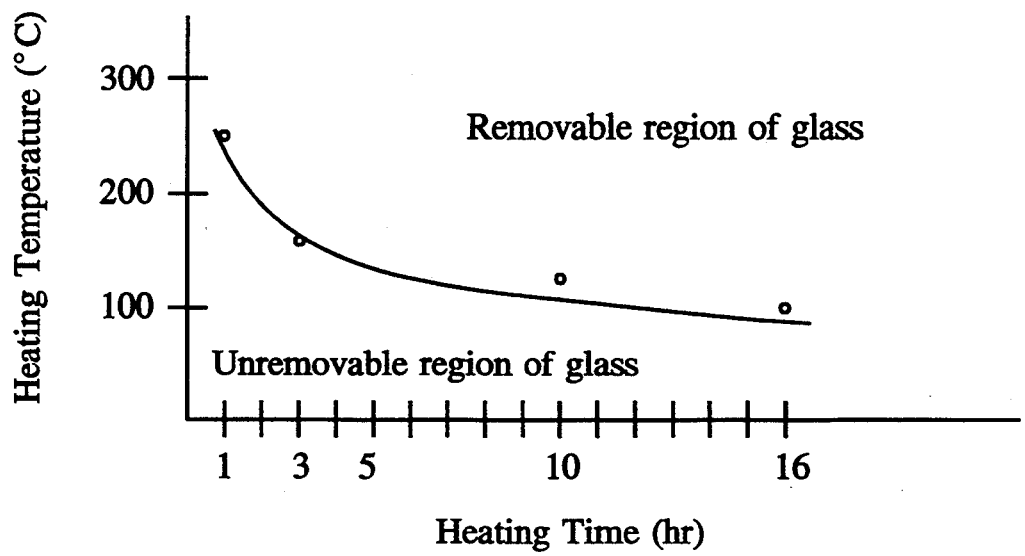
FIG. 2 is a graph showing a heating temperature in relation to a period of heating time for removal of adhered glass from the sintered powder body retained in sodium hydroxide solution of 40 percent by weight.
Figure 3:
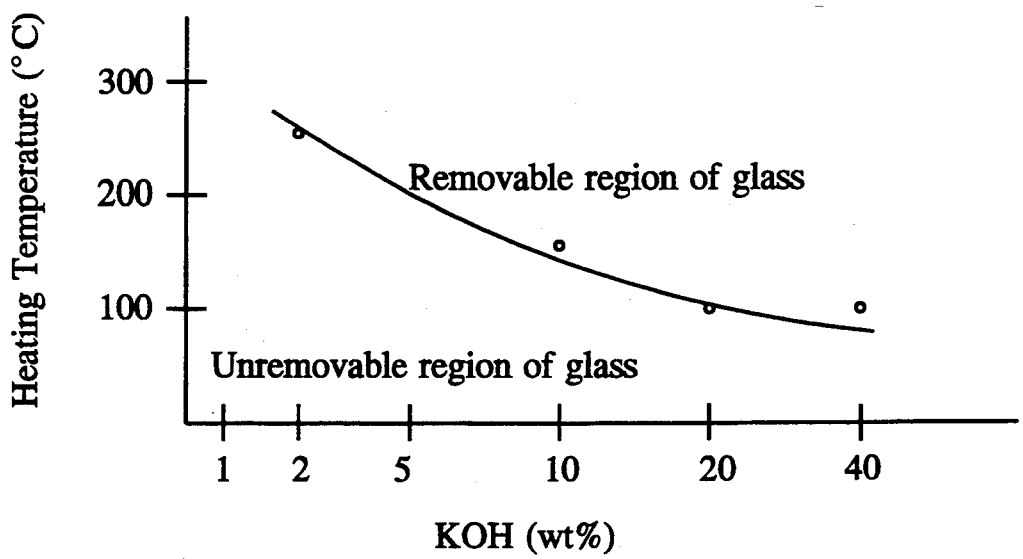
FIG. 3 is a graph showing a heating temperature in relation to the concentration of potassium hydroxide solution for removal of adhered glass from the sintered powder body retained in the treatment solution for twenty four (24) hours.
Figure 4:
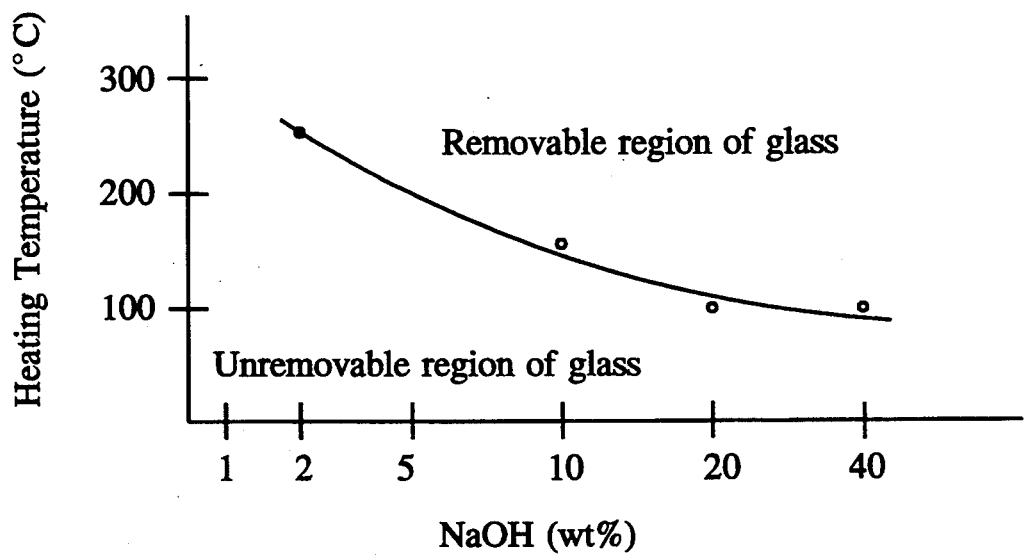
FIG. 4 is a graph showing a heating temperature in relation to the concentration of sodium hydroxide solution for removal of adhered glass from the sintered powder body retained in the treatment solution for twenty four (24) hours.
Figure 5:
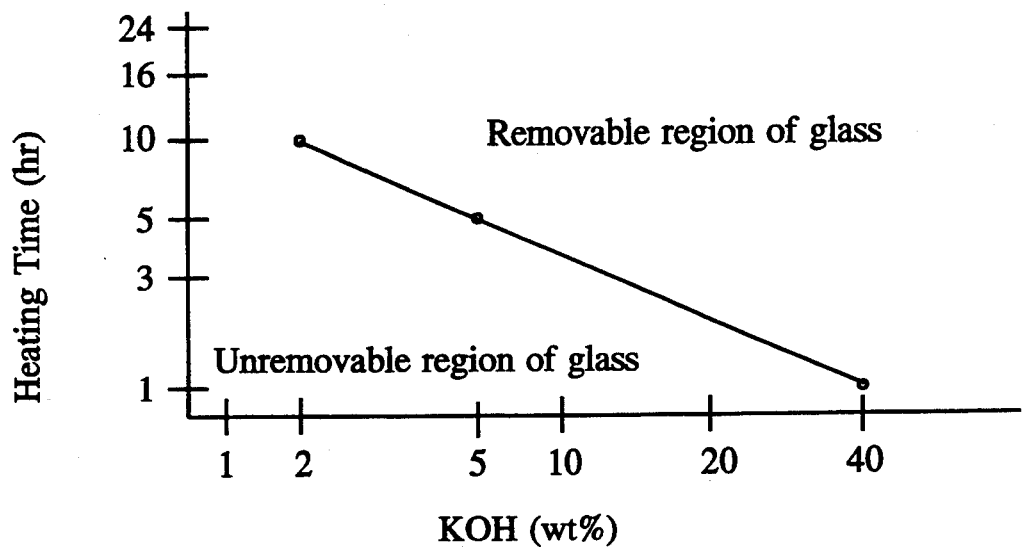
FIG. 5 is a graph showing a period of heating time in relation to the concentration of potassium hydroxide solution for removal of adhered glass from the sintered powder body retained at 250° C. in the potassium hydroxide solution.

In FIG. 1 there is shown a heating temperature in relation to a period of heating time for removal of adhered glass from the sintered powder blocks retained in potassium hydroxide solution of 40 percent by weight. In FIG. 2 there is shown a heating temperature in relation to a period of heating time for removal of adhered glass from the sintered powder blocks retained in sodium hydroxide solution of 40 percent by weight. In FIG. 3 there is shown a heating temperature in relation to the concentration of potassium hydroxide solution for removal of adhered glass from the sintered powder blocks retained in the potassium hydroxide solution for twenty four (24) hours. In FIG. 4 there is shown a heating temperature in relation to the concentration of sodium hydroxide solution for removal of adhered glass from the sintered powder blocks retained in the sodium hydroxide solution for twenty four (24) hours. In FIG. 5 there is shown a period of heating time in relation to the concentration of potassium hydroxide solution for removal of adhered glass from the sintered powder blocks retained at 250° C. in the potassium hydroxide solution. In FIG. 6 there is shown a period of heating time in relation to the concentration of sodium hydroxide solution for removal of adhered glass from the sintered powder blocks retained at 250° C. in the sodium hydroxide solution.

In FIG. 7 there is shown a period of heating time in relation to the number of rotation of the decomposition container for removal of adhered glass from the sintered powder blocks retained at 100° C. in potassium hydroxide solution of 40 percent by weight. In FIG. 8 there is shown a period of heating time in relation to the number of rotation of the decomposition container for removal of adhered glass from the sintered powder blocks retained at 250° C. in potassium hydroxide solution of 2 percent and 40 percent by weight.

Although in the above-described tests the container was rotated to cause flow of the treatment solution, the flow of the treatment solution may be caused by vibration of the container or stirring of the solution.

As is understood from the Tables 1 to 3 and FIGS. 1 to 8, it has been found that the glass adhered to the sintered powder body can be effectively removed in a condition where the sintered powder body is retained at a high temperature not less than 100° C. under presence of an alkali hydroxide solution of at least 2 percent by weight for not less than one hour. In this case, it is desirable that potassium hydroxide or sodium hydroxide is used as the alkali hydroxide solution. Since the reaction layer of glass on the surface of the sintered body becomes brittle, the layer of glass adhered to the sintered powder body can be easily removed by abrasive processing within a short time. Particularly, in the case that the flow of alkali hydroxide solution was caused by rotation of the container, the layer of adhered glass was removed from the sintered powder body within a half time when compared with a condition where the alkali hydroxide solution is remained still.

TABLE 1

| REAGENT | CONCEN-TRATION OF REAGENT (WT %) | Heating Temperature (°C.) & Time (hr) | | | | | | | | | | |
|---|---|---|---|---|---|---|---|---|---|---|---|---|
| | | 100° C. | | | | | | 120° C. | | | | |
| | | 1 | 3 | 5 | 10 | 18 | 24 | 1 | 3 | 5 | 10 | 16 | 24 |
| WATER | | X | X | X | X | X | X | X | X | X | X | X | X |
| KOH | 1 | X | X | X | X | X | X | X | X | X | X | X | X |
| | 2 | X | X | X | X | X | X | X | X | X | X | X | X |
| | 5 | X | X | X | X | X | X | X | X | X | X | X | X |
| | 10 | X | X | X | X | X | X | X | X | X | X | X | ○ |
| | 20 | X | X | X | X | X | ○ | X | X | X | X | ○ | ○ |
| | 40 | X | X | X | X | ○ | ○ | X | X | X | ○ | ○ | ○ |
| NaOH | 1 | X | X | X | X | X | X | X | X | X | X | X | X |

TABLE 1-continued

| REAGENT | CONCENTRATION OF REAGENT (WT %) | Heating Temperature (°C.) & Time (hr) 100° C. | | | | | | 120° C. | | | | | |
|---|---|---|---|---|---|---|---|---|---|---|---|---|---|
| | | 1 | 3 | 5 | 10 | 18 | 24 | 1 | 3 | 5 | 10 | 16 | 24 |
| | 2 | X | X | X | X | X | X | X | X | X | X | X | X |
| | 5 | X | X | X | X | X | X | X | X | X | X | X | X |
| | 10 | X | X | X | X | X | X | X | X | X | X | X | O |
| | 20 | X | X | X | X | X | O | X | X | X | X | O | O |
| | 40 | X | X | X | X | O | O | X | X | X | O | O | O |
| LiOH | 20 | X | X | X | X | X | X | X | X | X | X | X | X |
| | 40 | X | X | X | X | X | X | X | X | X | X | X | X |
| $K_2CO_3$ | 40 | X | X | X | X | X | X | X | X | X | X | X | X |

TABLE 2

| REAGENT | CONCENTRATION OF REAGENT (WT %) | Heating Temperature (°C.) & Time (hr) 180° C. | | | | | | 230° C. | | | | | |
|---|---|---|---|---|---|---|---|---|---|---|---|---|---|
| | | 1 | 3 | 5 | 10 | 18 | 24 | 1 | 3 | 5 | 10 | 16 | 24 |
| WATER | | X | X | X | X | X | X | X | X | X | X | X | X |
| KOH | 1 | X | X | X | X | X | X | X | X | X | X | X | X |
| | 2 | X | X | X | X | X | X | X | X | X | X | X | X |
| | 5 | X | X | X | X | X | X | X | X | X | X | X | X |
| | 10 | X | X | X | O | O | O | X | X | X | O | O | O |
| | 20 | X | X | X | O | O | O | X | X | O | O | O | O |
| | 40 | X | O | O | O | O | O | X | O | O | O | O | O |
| NaOH | 1 | X | X | X | X | X | X | X | X | X | X | X | X |
| | 2 | X | X | X | X | X | X | X | X | X | X | X | X |
| | 5 | X | X | X | X | X | X | X | X | X | X | X | X |
| | 10 | X | X | X | O | O | O | X | X | X | O | O | O |
| | 20 | X | X | X | O | O | O | X | X | O | O | O | O |
| | 40 | X | O | O | O | O | O | X | O | O | O | O | O |
| LiOH | 20 | X | X | X | X | X | X | X | X | X | X | X | X |
| | 40 | X | X | X | X | X | X | X | X | X | X | X | X |
| $K_2CO_3$ | 40 | X | X | X | X | X | X | X | X | X | X | X | X |

TABLE 3

| REAGENT | CONCENTRATION OF REAGENT (WT %) | Heating Temperature (°C. & Time (hr) 250° C. | | | | | |
|---|---|---|---|---|---|---|---|
| | | 1 | 3 | 5 | 10 | 16 | 24 |
| WATER | | X | X | X | X | X | X |
| KOH | 1 | X | X | X | X | X | X |
| | 2 | X | X | X | O | O | O |
| | 5 | X | X | O | O | O | O |
| | 10 | X | X | O | O | O | O |
| | 20 | X | X | O | ⊙ | ⊙ | ⊙ |
| | 40 | O | O | ⊙ | ⊙ | ⊙ | ⊙ |
| NaOH | 1 | X | X | X | X | X | X |
| | 2 | X | X | X | O | O | O |
| | 5 | X | X | O | O | O | O |
| | 10 | X | X | O | O | O | O |
| | 20 | X | X | O | ⊙ | ⊙ | ⊙ |
| | 40 | O | O | ⊙ | ⊙ | ⊙ | ⊙ |
| LiOH | 20 | X | X | X | O | O | O |
| | 40 | X | X | X | O | O | O |
| $K_2CO_3$ | 40 | X | X | X | O | O | o |

What is claimed is:

1. A method of forming a sintered body, comprising the steps of:

forming a preformed body of inorganic powder;

sintering said preformed body into a sintered body by hot isostatic pressing, said sintered body having an outer glass layer formed thereon during said hot isostatic pressing, said glass layer containing boric acid of 3 to 15 percent by weight; and exposing said outer glass layer to an alkali solution of at least 2 percent by weight at a temperature not less than 100° C. for not less than one hour, thereby removing the outer glass layer from the sintered body.

2. The method of claim 1, wherein said outer glass layer is exposed to an alkali solution of at least 20 percent by weight.

3. The method of claim 1, wherein said outer glass layer is exposed to the alkali solution at a temperature not less than 250° C. for not less than one hour.

4. The method of claim 1, wherein the sintered body is submerged in a closed container of alkali solution, and wherein said closed container is moved to cause flow of the alkali solution.

5. The method of claim 4, wherein said closed container is rotated to cause the flow of the alkali solution.

6. The method of claim 1, wherein said alkali solution comprises at least one of potassium hydroxide and sodium hydroxide.

* * * * *